United States Patent [19]
Bardel

[11] Patent Number: 6,021,519
[45] Date of Patent: Feb. 8, 2000

[54] DEVICE FOR PROTECTING AGAINST ACCELERATIONS

[75] Inventor: Michel Bardel, Maurepas, France

[73] Assignee: Intertechnique, France

[21] Appl. No.: 09/133,807

[22] Filed: Aug. 13, 1998

[30] Foreign Application Priority Data

Aug. 13, 1997 [FR] France ................................. 97 10343

[51] Int. Cl.[7] .................................................. B64D 10/00
[52] U.S. Cl. .................................. 2/2.14; 600/19; 600/20; 137/81.1
[58] Field of Search ........................... 2/2.14, 455, 227; 600/19, 20; 128/202.11; 137/81.1, 38, 39

[56] References Cited

U.S. PATENT DOCUMENTS

| | | | |
|---|---|---|---|
| 4,219,039 | 8/1980 | Jaggers | 137/38 |
| 5,170,814 | 12/1992 | Crome | 137/39 |
| 5,199,426 | 4/1993 | Aldworth et al. | 128/205.24 |

*Primary Examiner*—Michael A. Neas
*Attorney, Agent, or Firm*—Larson & Taylor

[57] ABSTRACT

An apparatus for protecting a wearer against positive acceleration comprises:

a trouser having inflatable pockets and a control unit having an outlet communicating with the pockets, an inlet communicating with a source of pressurized gas and an inertia body for sensing acceleration. The control unit inflates the pockets with pressurized gas under a pressure which increases responsive to positive acceleration according to a predetermined law when the positive acceleration exceeds a predetermined threshold higher than 1 g and modifies the predetermined law following detection of a degree of acceleration which is negative or lower than another threshold lower than 1 g.

8 Claims, 3 Drawing Sheets

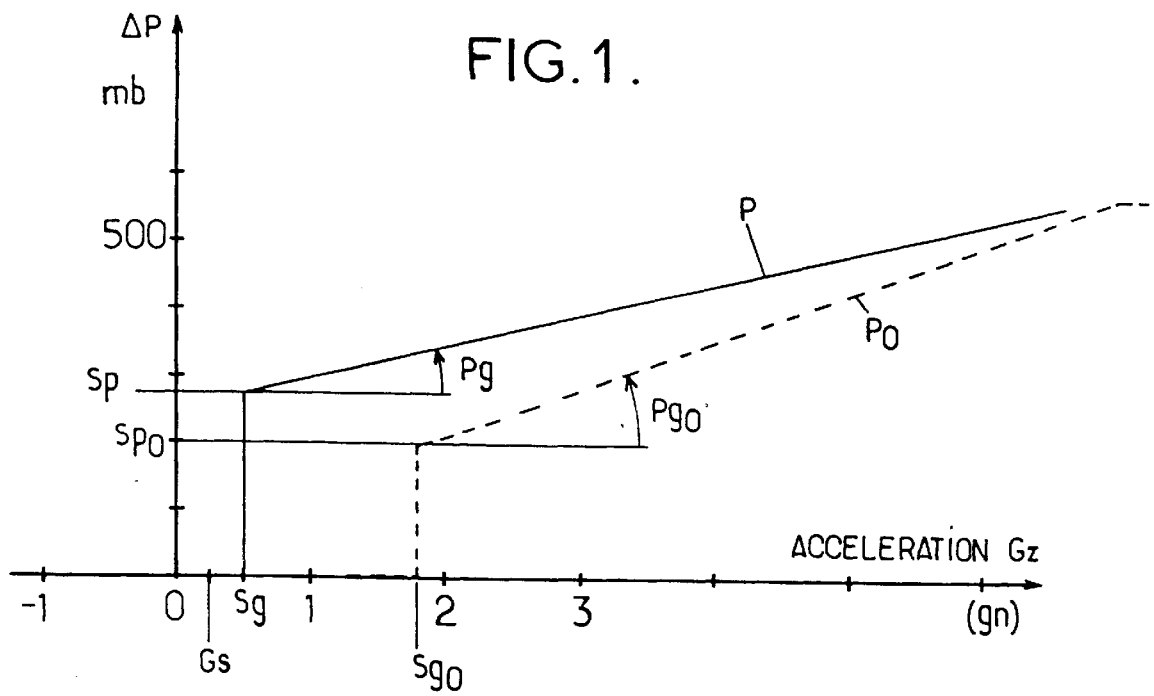
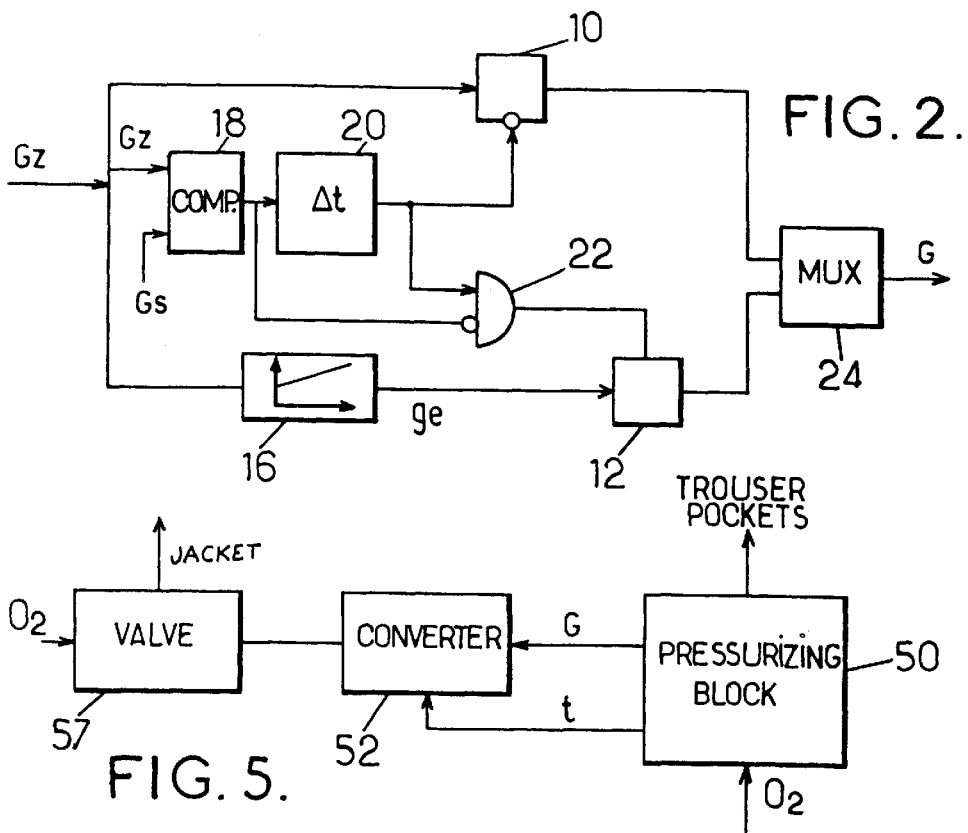

DEVICE FOR PROTECTING AGAINST ACCELERATIONS

BACKGROUND OF THE INVENTION

The present invention relates to devices for protecting the members of an aircraft crew, and in particular the pilots of combat aeroplanes, against the effect of the high accelerations encountered during a mission, in particular ones caused by tight turns.

Current protective devices include a suit or at least a pair of trousers, which is equipped with pockets and control means which supply the pockets with compressed gas when the positive load factor (acceleration in the direction of the lower body) exceeds a specific threshold.

It is desirable for the response time of the device to be short, in order to ensure satisfactory protection. A variety of arrangements have been adopted for this purpose, in particular preinflation of the pockets at altitude (FR 2 395 890) and above all the use of a control law which, in the pockets of a pair of trousers, establishes an overpressure level of a specific value as soon as a predetermined positive load factor is exceeded, and which then increases the overpressure substantially linearly starting from a virtual origin corresponding to a negative load factor (EP-A-0136223 or U.S. Pat. No. 4,546,491); this law is, for example, the one schematically represented by dashes in FIG. 1.

It has now been found that the tolerance to positive load factors is temporarily reduced after exposure to a negative load factor. This reduction could explain accidents encountered in combat, training and aerobatic aircraft.

The degradation in the resistance to positive load factors Gz may reach several times the standardized value $g_n$ of the acceleration due to gravity following a few seconds of exposure to a zero acceleration or to a negative load factor (which may be as much as $-3\ g_n$ in modern fighter aircraft). This degradation disappears after a few tenths of seconds, which are needed for re-establishing normal cardiovascular functions.

One might assume that the problem can be obviated by using a variation law for the pressure in the pockets which takes account of the worst case conditions. This solution entails a high degree of consumption of the inflation gas. It is a source of discomfort and fatigue for the individual wearing the trousers, the pockets of which will be inflated much more often and to a greater extent than is in general necessary.

SUMMARY OF THE INVENTION

An object of the invention is to provide a device which provides satisfactory protection for the wearer of a suit with inflatable pockets, but without increasing discomfort and gas consumption more than is needed for safety.

To this end, the invention provides a device in which the control means are designed temporarily to modify the inflation law for the pockets (and where appropriate the respiratory overpressure) following exposure to a negative load factor. The modification may be a shift to low load factors.

This shift can be made in several ways. It is possible to reduce the threshold beyond which an overpressure is created and/or increase an initial overpressure level; it is also possible to modify the slope of the law governing the variation from the initial overpressure.

The above characteristics, and others, will become more clearly apparent on reading the following description of particular embodiments, which are given by way of non-limiting examples. The description refers to the accompanying drawings.

BRIEF DESCRIPTION OF THE DRAWINGS

FIG. 1 shows the variation in the overpressure $\Delta P$ in the pockets of a pair of trousers, which is obtained in a known device (dashes) and in the case of a device according to an embodiment of the invention, after a negative load factor (solid line);

FIG. 2 is a block diagram showing the modifications made to the way in which the signal from the accelerometer of a conventional electronic device is processed in order to implement the invention;

FIG. 5 shows a possible method of connection between pockets of a pair of trousers and pockets of a jacket of an anti-G suit, which can be used in a device according to the invention.

DETAILED DESCRIPTION

Figure 3:
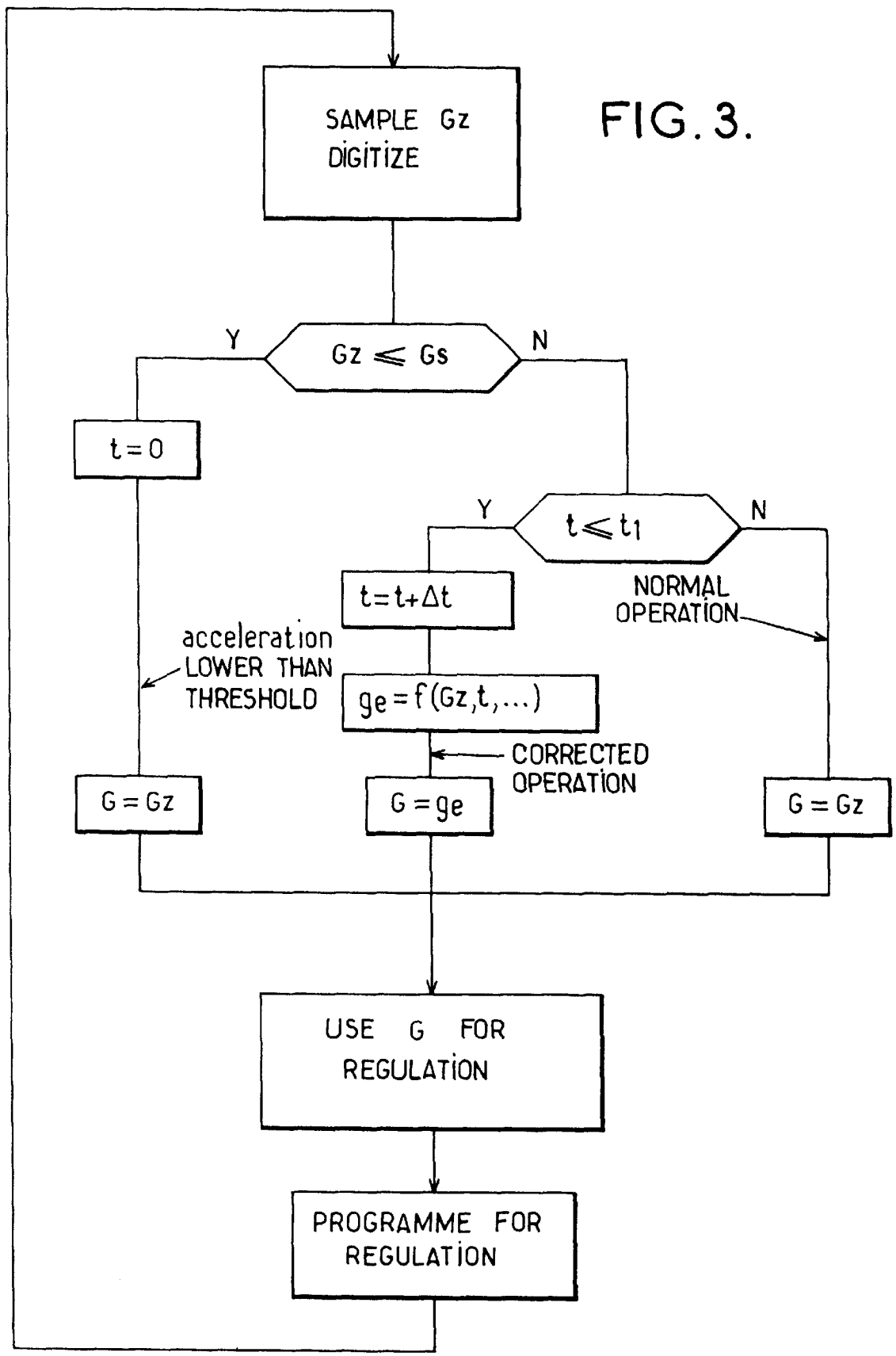
FIG. 3 is a simplified flow chart showing a way of processing the signal from the accelerometer before regulation in order to make it possible to use an unchanged main program.

FIG. 1 shows an illustrative embodiment of the invention, in the case in which the normal variation law of the overpressure $\Delta P$ (that is to say the law which is applied when the load factor +Gz has not been preceded by a negative load factor) exhibits a level $Sp_0$ as soon as Gz reaches a determined value $Sg_0$, for example equal to $1.8g_n$, then a linear part of slope $Pg_0$ up to a maximum value of $\Delta P$, which is for example 600 mbar at $9g_n$.

When a negative acceleration has been detected before a positive load factor, the variation law is modified in such a way as to lie to the left of the normal law in FIG. 1.

A first possibility consists in changing the law indicated by the line Po to the line indicated by P for a defined period of time after the detection of an acceleration which is negative or less than a threshold. This threshold may be equal to 0, slightly negative, or positive but equal merely to a fraction of the acceleration $g_n$ due to gravity. In the case illustrated in FIG. 1, this threshold is for example $Gs=0.2g_n$. The time $\Delta t$ during which the law represented by P is maintained is for example between 20 and 30 seconds. The device may be designed in such a way that $\Delta t$ increases commensurately as the duration or strength of the negative acceleration increases. Another solution consists in providing a device which gives rise to a variation law represented by a curve which lies between the lines $P_0$ and P and is selected on the basis of the strength of the negative or deficient load factor.

In the case shown in FIG. 1, the curve P differs from $P_0$ by:

shifting the threshold to the left, for example changing it from $Sg_0=1.8g_n$ to $Sg=0.5g_n$;

increasing the level, for example changing it from $Sp_0=200$ mbar to $Sp=250$ mbar; and reducing the slope, such that the variation curves lead substantially to the same overpressure for the maximum envisaged load factor, for example $9g_n$.

The device may be designed so as to make it possible to modify the values Sg, Sp and Pg before a mission, according to the pilot's environment (trousers, possible jacket, seat inclination, aircraft performance) and the physiological parameters of the pilot himself. The time Δt may also be made adjustable according to the same factors, in a range which may for example extend from 20 to 30 seconds.

The invention may be implemented both in a device with pneumatic control of the anti-G valve, as described in document EP-A-0,136,223, to which reference may be made, and with electronic control, as shown for instance in U.S. Pat. No. 4,336,590.

Electronically controlled devices have an accelerometer which delivers an electrical output signal representing the amplitude and direction of the acceleration. This signal will be continuously compared with a threshold Gs, for example $0.2g_n$.

As soon as a value less than Gs is measured, the device engages a time delay of duration Δt and changes $Sg_0$ to Sg (and where appropriate $Sp_0$ to Sp and $Pg_0$ to Pg).

The modified values are replaced by the normal values after the end of a time Δt if another load factor less than the threshold Gs does not occur.

If an acceleration greater than Sg is detected during Δt, the pockets are inflated according to the law corresponding to curve P. At the end of Δt, the law $P_0$ is resumed, instantaneously or progressively, by partially deflating the pockets.

The invention may be implemented by adopting modified values Sg, Sp, Pg and/or a value Δt taking a variety of parameters into account:

minimum load factor Gz, less than Gs, reached, time for which a load factor less than Gs is maintained.

Integration may be performed and weighted so as to give greater emphasis to the values of Gz which present the greatest danger to the body.

The modifications to be made to existing devices in order to implement the invention are very minor.

If an electronically controlled device includes an accelerometer having an electrical output signal representing the amplitude and direction of the acceleration, the threshold Sg may then be modified:

by changing the characteristics of the control stage of a supply solenoid valve, or more simply by modifying the signal originating from the accelerometer, so that it represents stronger acceleration.

When the device includes an analog-controlled pocket supply valve, the modification made to the layout of the accelerometer may be as shown in FIG. 2. The time delay Δt is reset each time the load factor passes below the threshold Gs and the signal represented in the load factor measured by the accelerometer is modified, for example through multiplying it by a gain of greater than 1 so long as the time Δt has not elapsed since the measured Gz has returned below Gs.

Although FIG. 2 shows the modification in the form of a diagram, the process may equally well be carried out by programming or by an application-specific integrated circuit (ASIC) as by a wired circuit.

The signal Gz delivered by the accelerometer (not shown) is applied to two analog channels, each provided with an analog gate 10 or 12. When the gate 10 is on, it sends the signal Gz without modification. In the converse case, its output signal is zero. When the gate 12 is on, it sends a signal $g_e$ which is shifted and/or amplified with respect to Gz. The signal $g_e$ may be constructed by an analog circuit or by an assembly including an input analog/digital converter, a correspondence table and an output digital/analog converter 16.

A control branch for the gates 10 and 12 makes it possible to turn them on alternately. It comprises a comparator 18 which delivers an output signal when Gz<Gs. This signal triggers a delay line 20, which may consist of a resettable monostable, the output of which is kept at 1 for a time Δt after Gz has returned above Gs.

The output of the delay line 20 turns the gate 10 off when it is at 1.

The same output of the delay line 20 is applied to one of the inputs of an AND gate 22, the other input of which receives the inverted output of the comparator 18. The AND gate 22 thus delivers a signal that turns the gate 12 on, when Gz>Gs and for a time Δt thereafter, while the gate 10 is off.

An output multiplexing circuit 24 delivers either a signal Gz, or the signal $g_e$ derived from Gz, or the signal zero.

The time delay is reset each time the load factor passes below the threshold Gs.

In the case of digital control, the program of a conventional device may be retained while preceding it by a processing operation which delivers the relevant value G as output and which, as in the previous case, is either real acceleration Gz or a modified value Ge, or 0, as appropriate, as shown by FIG. 3.

Gz is interrogated at regular intervals, which may be of the order of 0.1 s.

If Gz is less than the threshold Gs, a time delay t is initialized and the signal Gz is sent to the control program.

If Gz is above the threshold, then the time delay is interrogated. If the time t that has elapsed since the last dangerous acceleration is more than t1, it is the value Gz which is sent to the control program.

If the time t1 has not yet elapsed, the time delay is incremented and the acceleration which is sent is the corrected acceleration.

Figure 4:
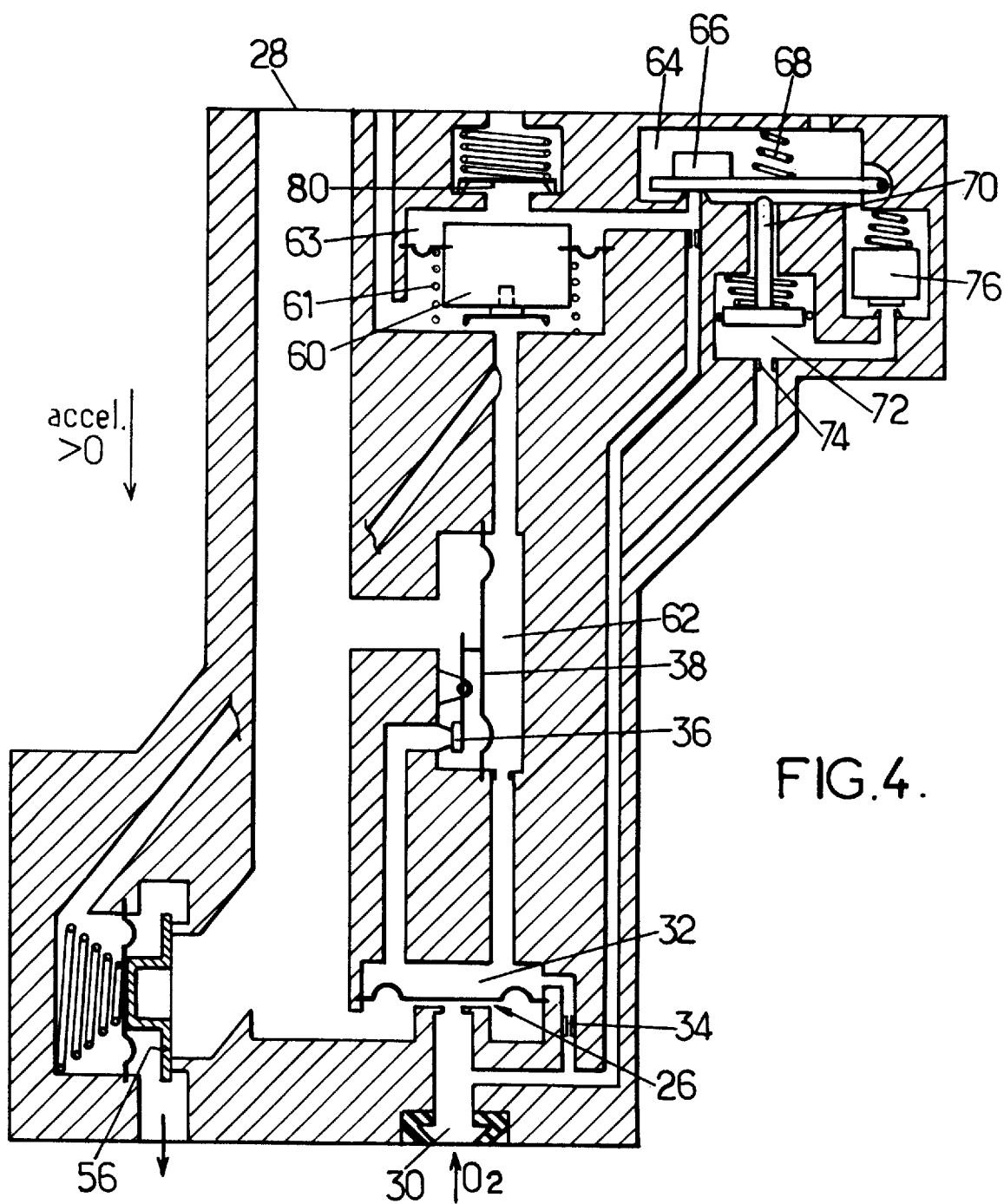
FIG. 4 is an outline diagram showing a possible addition to an existing pneumatic device, in order to implement the invention.

In order to implement the invention in a pneumatic device, it is sufficient to add a few elements to the anti-G valve of standard architecture. FIG. 4 shows a valve having a main regulator 26 for supplying the pockets through an outlet 28, from a pressurized oxygen feed 30. A drain regulator 56 makes it possible to return the chamber to ambient pressure. The driving chamber 32 of the main regulator 26 is connected to the pressurized oxygen feed through a constriction 34. The pressure prevailing therein is controlled by a drive regulator 36 controlled by a diaphragm 38. The diaphragm 38 is subjected to the pressure in a compartment 62 which is connected by a nozzle to the chamber 32 of the main regulator. An inertial mass 60 for detecting positive acceleration is pressed by a spring 61 towards a position in which it connects the compartment 62 to the atmosphere. In the event of a positive acceleration exceeding a threshold which depends on the pressure prevailing behind the inertial mass, the latter cuts off the communication, so that the pressure in the compartment 62 rises. When the acceleration disappears, the inertial mass is raised by the spring and causes the drain regulator 56 to open.

The design described so far is conventional.

The device shown in FIG. 4 furthermore includes means which make it possible to modify the variation law for the overpressure as a function of the positive acceleration, when the latter follows on from a negative acceleration.

To this end, the rear of the inertial mass 60 is subjected to an enhanced pressure following a negative acceleration. A chamber 63 located behind the inertial mass 60 is connected, on the one hand, to the oxygen feed through a constriction and, on the other hand, to a compartment 64 connected to free air through a regulator controlled by an inertial mass 66 for detecting negative accelerations (towards the top in FIG. 4). A spring 68 exerts, on the lever bearing the inertial mass 66, a force which tends to shut off the communication with the atmosphere.

The arrangement which has just been described is supplemented by timer means which comprise a delay plunger 70 subjected to the action of the pressure in a plunger chamber 72. This chamber is connected to the oxygen feed through a delay nozzle 74, and to the atmosphere through a regulator controlled by an inertial mass 76 for zeroing the timer.

A device of this type operates as follows:

Neutral position, no acceleration:

The inertial mass 76 is kept on its seat by its spring. Control gas drawn from the supply 30 is admitted into the plunger chamber 72 through the nozzle 74. The pressure in the plunger chamber keeps the plunger 70 up, against the action of its spring. The plunger 70 pushes the lever of the inertial mass 66 upwards while compressing the spring 68. The regulator under the inertial mass 66 is open and purges the chamber 63 of the anti-G mass 60: this inertial mass is subject only to its own weight and behaves as a conventional anti-G valve.

Negative acceleration:

The delay mass 76 compresses its spring and opens a constricted passage which drains the plunger chamber 72. The plunger 70 moves back under the effect of its spring. However, the lever remains raised owing to the force exerted by the inertial mass 66 which is subjected to the negative acceleration and which compresses the spring 68.

Transient after disappearance of the negative acceleration:

The inertial mass 66 returns to its seat. The flow of oxygen arriving through the supply nozzle of the chamber 63 no longer escapes through the regulator located under the inertial mass 66. The pressure above the anti-G mass 60 rises to a value dictated by the limiting regulator 80.

The inertial mass 60 then behaves as if its apparent weight were increased by P×S, p being the pressure in the chamber 63 and S the effective cross-section of the sealing diaphragm of the inertial mass 60. The anti-G valve behaves as if the acceleration were greater than its actual value.

This situation lasts as long as the inertial mass 76 remains on its seat and the flow delivered by the nozzle 74 does not escape through the regulator controlled by the inertial mass 76. The pressure in the chamber 72 rises progressively. The plunger returns progressively into the "out" position, and reaches it at the end of a time T1 dictated by the dimensioning of the nozzle 74 and of the chamber.

Situation once T1 has elapsed after the disappearance of the negative acceleration:

The plunger 70 is in the "out" position and pushes the lever of the inertial mass 66 so as to open its regulator, which purges the chamber 63 of the inertial mass 60. The anti-G valve resumes a nominal operating mode.

When the aircraft has a system that creates a respiratory overpressure which increases with the positive load factor, of the type described in the documents already cited, it is not necessary to modify the connection between the inflation circuit for the pockets of the trousers and the circuit controlling the respiratory overpressure.

However, it may be useful to modify the law connecting the pressure in the pockets of the trousers and the pressure in the pockets of the jacket, in order to account for negative load factors, the purpose of this being to give the cardiovascular system time to react and not to compromise it by applying a premature strong thoracic pressure masking the lack of blood pressure.

The relationship between the pressure in the pockets of the trousers and the pressure in the pockets of the jacket may be chosen according to the pilot's environment.

FIG. 5 shows one possible arrangement by way of example. Block 50 includes all the elements for pressurizing the pockets of the trousers. This block delivers the value G to a converter 52 (FIG. 2). On the basis of G and the time t, the converter constructs a different variation law which is used to control a valve 57 for supplying the pockets of the jacket. The converter may, in particular, consist of a look-up table controlling a solenoid valve which is associated with a discharge regulator.

I claim:

1. Apparatus for protecting a wearer against positive acceleration comprising:

a trouser having inflatable pockets and control means having outlet means communicating with said pockets, inlet means communicating with a source of pressurized gas and means for sensing acceleration, wherein said control means are arranged to inflate said pockets with said pressurized gas under a pressure which increases responsive to said positive acceleration according to a predetermined law when said positive acceleration exceeds a predetermined threshold higher than 1 g and arranged to modify said predetermined law following detection of a degree of acceleration which is negative or lower than another threshold lower than 1 g.

2. Apparatus according to claim 1, wherein said control means are arranged for said predetermined law (a) to include a first predetermined pressure step upon detection of a value of acceleration higher than said predetermined threshold and then a first predetermined rate of pressure increase when not preceded by an acceleration lower than said predetermined degree of acceleration, and (b) to include a second predetermined pressure step higher than said first predetermined pressure step when preceded by an acceleration lower than said degree of acceleration.

3. Apparatus according to claim 1, wherein said control means are arranged for said predetermined law (a) to include a first predetermined pressure step upon detection of a first value of acceleration higher than said predetermined threshold and then a first predetermined rate of pressure increase when not preceded by an acceleration lower than said predetermined degree of acceleration, and (b) to include a second predetermined pressure step at a threshold lower than said first value when preceded by an acceleration lower than said degree of acceleration.

4. Apparatus according to claim 3, wherein said control means are arranged for said predetermined law to have a second rate of pressure increase lower than said first rate.

5. Apparatus according to claim 1, wherein said means for sensing a positive acceleration are arranged for delivering a positive acceleration responsive signal and said control means further comprise:

two analog processing channels connected to receive said signal, a first one of said processing channels having an analog gate which is normally opened and is temporarily blocked following detection of said degree of acceleration which is negative of lower than said another threshold, a second one of said channels having serially connected means for modifying the acceleration responsive signal and analog gate means temporarily opened following said detection; and multiplexer means connected to receive outputs of said two channels and to deliver a control signal to valve means controlling the pressure in said pockets.

6. Device according to claim 1, wherein said control means comprise acceleration responsive means constructed to deliver an acceleration responsive digital signal and computer means having a stored routine for precessing said acceleration responsive digital signal and a stored control program for generating said predetermined law.

7. Device for protection of a crew member against positive acceleration directed toward the feet, comprising:

a housing having an inlet for connection to a source of pressurized gas and an outlet for connection to inflatable trouser pockets of a g-suit, an inertia unit movable responsive to a positive acceleration higher than a first threshold, against an action of resilient return means, toward a position where it communicates said inlet with said outlet, and an inertia body movable responsive to a negative acceleration higher than a second threshold from a first position where said body separates a chamber having a continuous restricted communication with said inlet from atmosphere to a second position where it opens a passage between said chamber and atmosphere, wherein said inertia unit is additionally subjected to a force increasing with pressure in said chamber and biasing said inertia unit toward said position where it communicates said inlet with said outlet, and whereby said first threshold is decreased responsive to a negative acceleration higher than said second threshold.

8. Device according to claim 7, further comprising delaying means responsive to said negative acceleration for delaying return of the inertia body to the first position where it closes the communication between said chamber and atmosphere.

* * * * *